(12) United States Patent
Shin et al.

(10) Patent No.: US 10,563,757 B2
(45) Date of Patent: Feb. 18, 2020

(54) HYDRAULIC CONTROL SYSTEM FOR AUTOMATIC TRANSMISSION

(71) Applicants: HYUNDAI MOTOR COMPANY, Seoul (KR); KIA MOTORS CORPORATION, Seoul (KR)

(72) Inventors: Yong Uk Shin, Suwon-si (KR); Woongseok Kang, Hwaseong-si (KR); Seongwook Ji, Gunpo-si (KR); Chon Ok Kim, Yongin-si (KR); Woochurl Son, Seongnam-si (KR); Seung Jung Seo, Seoul (KR); Minho Chae, Incheon (KR); Hyu Tae Shim, Hwaseong-si (KR); Ki Dong Kim, Anyang-si (KR); Ju Ho Song, Suwon-si (KR); Jihoon Kim, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 20 days.

(21) Appl. No.: 15/827,865

(22) Filed: Nov. 30, 2017

(65) Prior Publication Data
US 2019/0128407 A1 May 2, 2019

(30) Foreign Application Priority Data

Oct. 27, 2017 (KR) .......................... 10-2017-0141152

(51) Int. Cl.
*F16D 48/02* (2006.01)
*F16H 61/02* (2006.01)

(52) U.S. Cl.
CPC ..... *F16H 61/0206* (2013.01); *F16D 48/0206* (2013.01); *F16D 2048/0209* (2013.01); *F16D 2048/0221* (2013.01); *F16D 2048/0257* (2013.01); *F16H 2061/0209* (2013.01); *Y10T 477/6936* (2015.01); *Y10T 477/69365* (2015.01)

(58) Field of Classification Search
CPC ....... Y10T 477/6936; Y10T 477/69365; F16H 91/0206; F16H 2061/0209; F16D 48/0206; F16D 2048/0209; F16D 2048/0221; F16D 2048/0257
See application file for complete search history.

(56) References Cited

U.S. PATENT DOCUMENTS

| 4,052,930 | A | * | 10/1977 | Hiramatsu | .......... F16H 61/0267 137/596.12 |
| 8,568,273 | B2 | | 10/2013 | Yagi | |
| 9,062,782 | B2 | | 6/2015 | Kinch et al. | |
| 2007/0135253 | A1 | * | 6/2007 | Kondoh | .............. F16H 61/0206 475/116 |
| 2012/0138415 | A1 | | 6/2012 | Yagi | |

FOREIGN PATENT DOCUMENTS

| JP | 2006207742 A * | 8/2006 | ............. F16D 48/02 |
| JP | 4395889 B2 | 1/2010 | |
| JP | 5157465 B2 | 3/2013 | |

* cited by examiner

*Primary Examiner* — Roger L Pang
(74) *Attorney, Agent, or Firm* — Brinks Gilson & lione

(57) ABSTRACT

The present disclosure provides a hydraulic control system for an automatic transmission. The system includes: a linear solenoid valve configured to control a line pressure and to supply the line pressure to a coupling element, a shift valve to which an output hydraulic pressure of the linear solenoid valve is supplied, and a transmission control unit configured to control the shift vale and the linear solenoid valve.

8 Claims, 6 Drawing Sheets

HYDRAULIC CONTROL SYSTEM FOR AUTOMATIC TRANSMISSION

CROSS-REFERENCE TO RELATED APPLICATION

This application claims priority to and the benefit of Korean Patent Application No. 10-2017-0141152, filed on Oct. 27, 2017, which is incorporated herein by reference in its entirety.

FIELD

The present disclosure relates to a hydraulic control system for an automatic transmission, and more particularly to a hydraulic control system for an automatic transmission that is capable of stably controlling a hydraulic pressure.

BACKGROUND

The statements in this section merely provide background information related to the present disclosure and may not constitute prior art.

A vehicular automatic transmission includes a torque converter and a power train as a multi-stage transmission mechanism connected to the torque converter. The automatic transmission includes a hydraulic control system for selectively operating any one operation element among operation elements of the power train according to a driving state of a vehicle.

The hydraulic control system for the automatic transmission is configured to regulate a hydraulic pressure generated from an oil pump to a constant line pressure through a regulator valve, and then to control the adjusted pressure by a linear solenoid valve again to supply the controlled pressure to a coupling element constituted by a clutch and a brake.

However, in the hydraulic control system in the related art, when the supplied hydraulic pressure corresponds to a plurality of required hydraulic pressures, the maximum required hydraulic pressure of the linear solenoid valve is set to the maximum required hydraulic pressure, and when the coupling element is operated with the required hydraulic pressure of low pressure, driving current of the linear solenoid is suppressed, thereby controlling an appropriate output hydraulic pressure.

However, in the case of controlling an output hydraulic pressure while suppressing drive current of the linear solenoid valve as described above, a drive current control range is narrowed until the output hydraulic pressure is controlled to the required hydraulic pressure of low pressure, and as a result, the control of the output hydraulic pressure may not be efficient.

The above information disclosed in this section is only for enhancement of understanding of the background of the disclosure and therefore it may contain information that does not form the prior art that is already known in this country to a person of ordinary skill in the art.

SUMMARY

The present disclosure provides a hydraulic control system for an automatic transmission that is capable of stably controlling a hydraulic pressure.

One form of the present disclosure provides a hydraulic control system for an automatic transmission, including: a linear solenoid valve configured to control a line pressure and to supply the line pressure to a coupling element, a shift valve to which an output hydraulic pressure of the linear solenoid valve is supplied, and a transmission control unit configured to control the shift valve and the linear solenoid valve, and the linear solenoid valve is supplied with a first feedback control pressure that is a portion of the output hydraulic pressure supplied as the coupling element to both sides of an input port and an output port and a second feedback control pressure that when applied, expands an opening area of the input port, the shift valve is configured to selectively supply the output hydraulic pressure of the linear solenoid valve as the second feedback control pressure according to a signal pressure, and the transmission control unit is configured to control the second feedback control pressure as a supply state by cutting off the signal pressure of the shift valve when a required hydraulic pressure of the coupling element is high and control second feedback control pressure as a cut-off state by supplying the signal pressure of the shift valve when the required hydraulic pressure of the coupling element is low.

The linear solenoid valve may include a valve body, a valve spool slidably embedded in the valve body, an elastic member configured to elastically support one end of the valve spool, and a linear solenoid configured to provide a force against the elastic force of the elastic member, and the valve body may have a first port as an input port, a second port as an output port, third and fourth ports formed on both sides of the second port, a fifth port formed adjacent to the third port, and a sixth port as a discharge port.

Here, the line pressure may be supplied to the first port, the second port may be connected with the coupling element through a first path, the third and fourth ports may be connected with first and second branch paths branched from the first path, and the fifth port may be connected to selectively supply the hydraulic pressure of the first path as the feedback control pressure by controlling the shift valve connected through the second and third paths.

Respective orifices may be disposed on the first and second branch paths.

The shift valve may include a valve body, a valve spool slidably disposed in the valve body, and an elastic member configured to provide elastic force against the signal pressure to one end of the valve spool, and the valve body may include a six port to which the signal pressure is supplied, a seventh port configured to receive the output hydraulic pressure of the linear solenoid valve, an eighth port selectively connected with the seventh port, and a ninth port configured to selectively discharge the hydraulic pressure supplied to the eighth port.

Here, the signal pressure may be supplied to the sixth port, the seventh port may be connected with a fifth path connected to a fourth path, and the eighth port may be connected with the fifth port of the linear solenoid valve through a sixth path.

Further, a third orifice may be disposed on the third path.

Each linear solenoid valve of three linear solenoid valves are independently controlled by a different valve of three shift valves such that three coupling elements are configured to operate in one shift stage, wherein the each linear solenoid valve of three linear solenoid valves is configured to control the hydraulic pressure supplied to each coupling element of three coupling elements.

In addition, one linear solenoid valve of three linear solenoid valves is independently controlled by one shift valve of three shift valves such that three coupling elements operate in one shift stage, wherein one linear solenoid valve of three linear solenoid valves is configured to control the hydraulic pressure supplied to one coupling element of three coupling elements, and two linear solenoid valves of three linear solenoid valves are controlled by one common shift valve, wherein two linear solenoid valves of three linear solenoid valves are configured to control the hydraulic pressure supplied to two coupling elements of three coupling elements.

Each linear solenoid valve of three linear solenoid valves is controlled by one common shift valve such that three coupling elements operate in one shift stage, wherein the each linear solenoid valve of three linear solenoid valves is configured to control the hydraulic pressure supplied to the each coupling element of three coupling elements.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
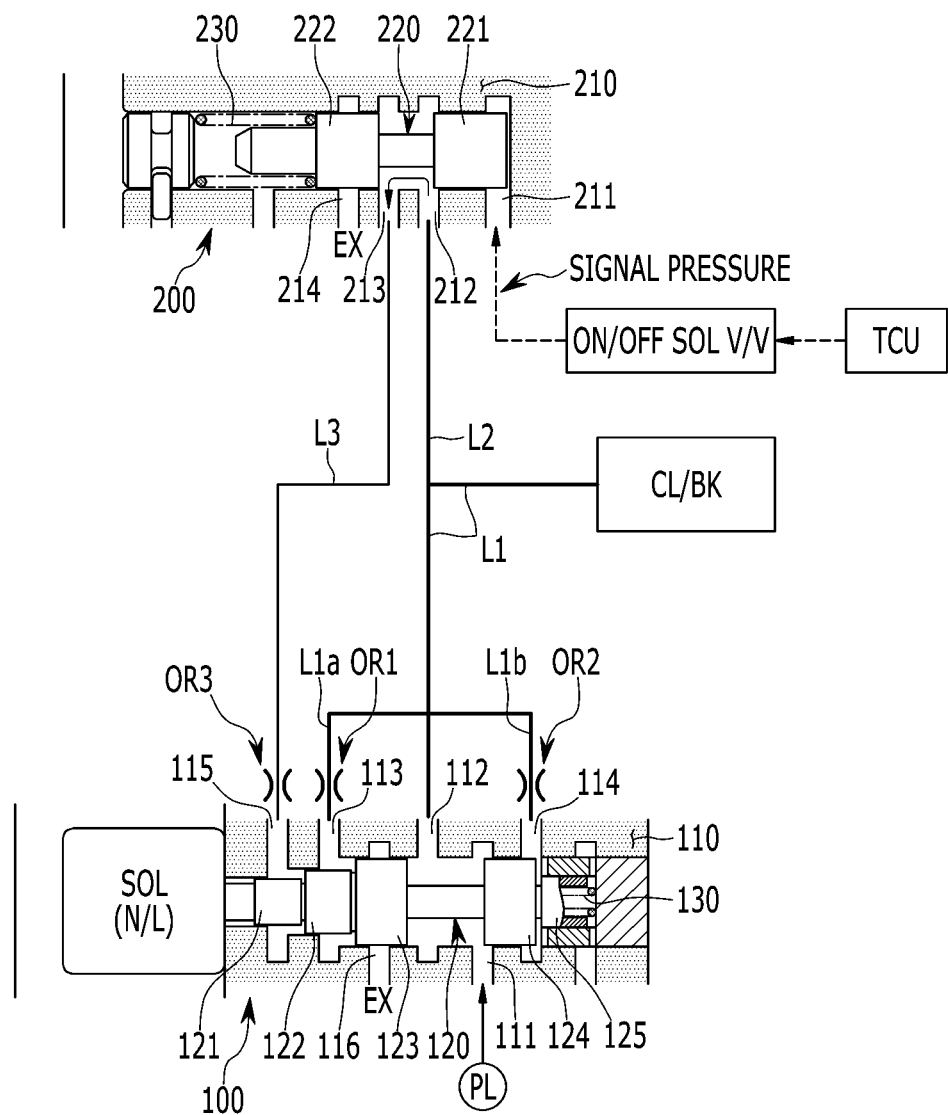
FIG. 1 is a configuration diagram of a hydraulic control system adopting a linear solenoid valve of a normal close type in a hydraulic control system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Parts not associated with description are omitted for clearly describing the present disclosure and like reference numerals designate like elements throughout the specification.

In the following description, dividing names of components into first, second and the like is to divide the names because the names of the components are the same as each other and an order thereof is not particularly limited.

FIG. 1 is a configuration diagram of one form of a hydraulic control system adopting a linear solenoid valve of a normal close type in a hydraulic control system.

Referring to FIG. 1, the hydraulic control system in some forms of the present disclosure includes a linear solenoid valve 100 for regulating and supplying a line pressure PL to a coupling element (clutch or brake CL or BK) of an automatic transmission, a shift valve 200 to which an output hydraulic pressure of the linear solenoid valve 100 is supplied, and a transmission control unit TCU for controlling the linear solenoid valve 100 and the shift valve 200.

The linear solenoid valve 100, which is configured by a normally closed type in which the supply of hydraulic pressure is interrupted when an electric signal is not applied, includes a valve body 110, a valve spool 120 slidably disposed in the valve body 110, an elastic member 130 elastically supporting the valve spool 120 to a left side of the figure, and a linear solenoid SOL providing counter force against elastic force of the elastic member 130.

The valve body 110 has a first port 111 as an input port, a second port 112 as an output port, and third and fourth ports 113 formed on both sides of the second port 112, a fifth port 115 formed adjacent to the third port 113, and a sixth port 116 which is a discharge port.

Accordingly, the line pressure PL controlled by a regulator valve (not illustrated) is supplied to the first port 111 and the second port 112 is connected to the coupling element CL/BK through a first path L1 to output an output hydraulic pressure of the linear solenoid valve 100 to the coupling element CL/BK, the third and fourth ports 113 and 114 are connected with first and second branch paths L1a and L1b branched from the first path L1 to supply the output hydraulic pressure of the second port 112 as a feedback control pressure, and the fifth port 115 selectively supplies some of the hydraulic pressure supplied to the coupling element CL/BK as the feedback control pressure.

In addition, first and second orifices OR1 and OR2 are disposed on the first and second branch paths L1a and L1b, respectively to stably supply the feedback control pressure.

In the valve spool 120, first, second, third, fourth, and fifth lands 121, 122, 123, 124, and 125 are sequentially formed toward a free end from the linear solenoid SOL and the first and second lands 121 and 122 act on the feedback control pressure supplied to the fifth port 115.

Further, when the third and fourth lands 123 and 124 may selectively connect the first port 111 to the second port 112 or selectively connect the second port 112 to the sixth port 116, and the feedback control pressure supplied to the third and fourth ports 113 and 114 acts on mutually opposing sides, movement of the valve spool 120 is stabilized.

Further, the elastic member 130 disposed between the fifth land 125 and the valve body 110 exerts the elastic force to push the valve spool 120 toward the linear solenoid SOL.

Accordingly, when no electric signal is applied to the linear solenoid SOL, the valve spool 120 is pushed toward the linear solenoid SOL by the elastic force of the elastic member 130 to close the first port 111.

When an electric signal is applied to the linear solenoid (SOL) to control an opening area of the first port 111, if the feedback control pressure is supplied to the fifth port 115, the feedback control pressure acts on the second land 122 and the valve spool 120 is pushed to a right side of the figure land 122, and as a result, the opening area of the first port 111 is increased to supply a high hydraulic pressure to the coupling element CL/BK.

The shift valve 200 includes a valve body 210, a valve spool 220 slidably disposed in the valve body 210, and an elastic member 230 elastically supporting the valve spool 220 in the figure.

The valve body 210 includes a first port 211 to which a signal pressure is supplied, a second port 212 to which hydraulic pressure of the second port 112 of the linear solenoid valve 100 is supplied, a third port 213 for supplying the hydraulic pressure supplied to the second port 212 to the fifth port 115 of the linear solenoid valve 100, and a fourth port 214 selectively discharging the hydraulic pressure supplied to the third port 213.

A control pressure of an on/off solenoid valve (ON/OFF SOL V/V) controlled by a transmission control unit (TCU) is supplied to the first port 211 as a signal pressure, some of the hydraulic pressure supplied to the coupling element CL/BK is connected to the second path L2 connected to the first path L1, and the third port 213 is connected to the linear solenoid valve 100 through the third path L3 and supplies the hydraulic pressure selectively supplied to the third port 213 to the fifth port 115 of the linear solenoid valve 100.

A third orifice OR3 is disposed in the third path L3 so as to stably supply the hydraulic pressure supplied to the fifth port 115 of the linear solenoid valve 100.

The valve spool 220 includes a first land 221 acting on the signal pressure supplied to the first port 211 and a second land 221 selectively connecting the second port 212 and the third port 213 together with the first land and an elastic member 230 providing the elastic force against the signal pressure of the first port 211 is disposed between the second land 222 and the valve body 220.

Accordingly, when the signal pressure is supplied to the first port 211, the valve spool 220 moves to the left side of the figure while overcoming the elastic force of the elastic member 230 to cut off the second port 212 (cut-off state) and when the signal pressure is not supplied to the first port 211, the valve spool 220 moves to the right side in the figure due to the elastic force of the elastic member 230 and connects the second port 211 and the third port 213 (supply state) to supply the hydraulic pressure supplied to the second port 212 to the fifth port 115 of the linear solenoid valve 100 as the feedback control pressure.

When the shift valve 200 is controlled to be in the cut-off state, the feedback control pressure is not supplied to the fifth port 115 of the linear solenoid valve 100, and as a result, the opening area of the first port 111 is kept small to control the oil pressure supplied to the coupling element CL/BK to be low (low pressure).

Further, contrary to this, when the shift valve 200 is controlled to be in the supply state, the feedback control pressure is supplied to the fifth port 115 of the linear solenoid valve 100, and as a result, the opening area of the first port 111 is larger to control the oil pressure supplied to the coupling element CL/BK to be high (high pressure).

That is, the transmission control unit TCU may control the signal pressure to the first port 211 of the shift valve 200 to be supplied by opening the on/off solenoid valve (ON/OFF SOL V/V) when a shift lever (not illustrated) is in a D range (forward) (cut-off state) and the signal pressure supplied to the first port 211 of the shift valve 200 to be cut off by closing the to the on/off solenoid valve (ON/OFF SOL V/V) when the shift lever is in an R range (reverse) (supply state).

Figure 2:
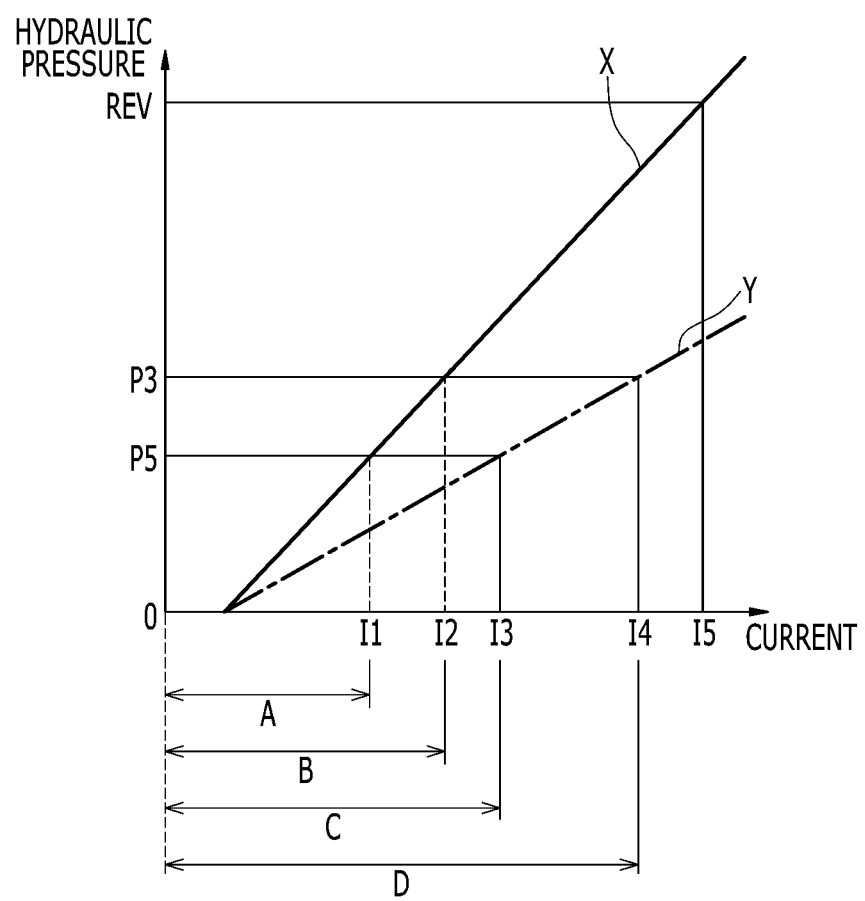
FIG. 2 is an explanatory diagram illustrating a gain characteristic of the hydraulic control system.

FIG. 2 is an explanatory diagram illustrating a gain characteristic (current-hydraulic pressure) of the hydraulic control system in some forms of the present disclosure.

Referring to FIG. 2, X represents the gain characteristic of the shift valve 200 in the supply state and Y represents the gain characteristic of the shift valve 200 in the cut-off state.

Therefore, in some forms of the present disclosure, assuming that the coupling element CL/BK is operated at a reverse shift stage, a forward third shift stage, and a forward fifth shift stage, the required hydraulic pressure at the time of setting the reverse shift stage is referred to as REV, the required hydraulic pressure at the time of setting the forward third shift stage is referred to as P3, and the required hydraulic pressure at the time of setting the forward fifth shaft stage is referred to as P5, a relationship of REV>P3>P5 is normally established in proportional to a duty ratio and the reason is that the largest hydraulic pressure is required in the reverse shift stage having the largest torque ratio in charge and a smaller hydraulic pressure is required from the forward shift stage to a high-speed shift stage in which the duty ratio is gradually reduced.

Therefore, when the coupling element CL/BK is controlled by a gain characteristic X of the supply state of the shift valve 200, which is one gain characteristic, the maximum output hydraulic pressure of the linear solenoid valve 100 needs to match the required hydraulic pressure REV of the reverse shift stage having the largest required hydraulic pressure.

Accordingly, when the forward third-speed shift stage is set, it is necessary to control drive current to range B between current values 0 to I2 for the output hydraulic pressure and when the forward fifth shift stage is set, it is necessary to control the drive current to range A between 0 to I1 for the output hydraulic pressure.

However, in some forms of the present disclosure, the coupling element CL/BK may be controlled in accordance with a gain characteristic Y of the cut-off state of the shift valve 200 at the forward shift stage and in this case, the current value may be controlled in range D between 0 and I4 in the forward third shift stage and the current value may be controlled in range C between 0 and I3 in the forward fifth shift stage.

Therefore, it is possible to finely control the output hydraulic pressure of the forward third shift stage and the forward fifth shift stage and controllability of the coupling element CL/BK may be enhanced.

Figure 3:
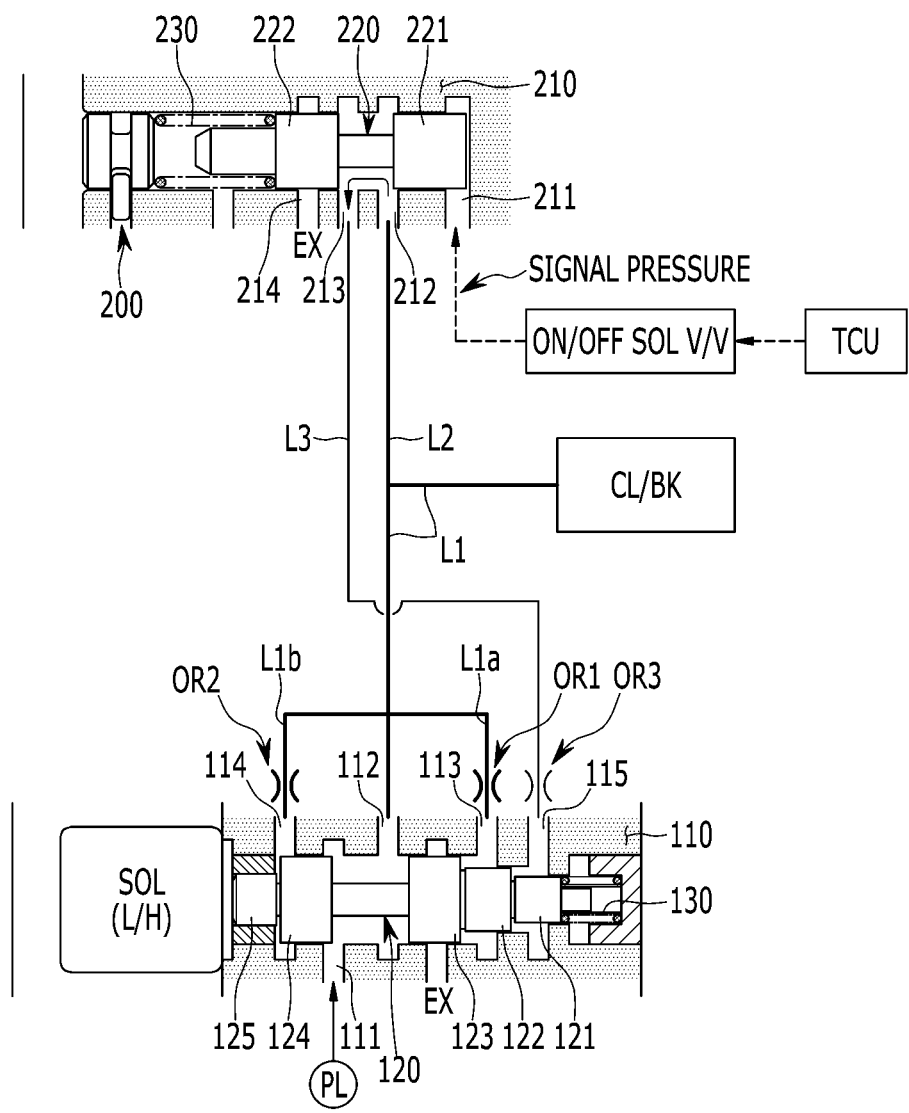
FIG. 3 is a configuration diagram of a hydraulic control system adopting a linear solenoid valve of a normal open type in the hydraulic control system.

FIG. 3 is a configuration diagram of a hydraulic control system adopting a linear solenoid valve of a normal open type in the hydraulic control system in some forms of the present disclosure.

Although the linear closed solenoid valve 100 of the normal close type is described in some forms of the present disclosure, the linear solenoid valve 100 may be configured by the normal open type linear solenoid valve 100 of which a valve is opened in an energized stop state (a state in which electricity is not applied) as illustrated in FIG. 3.

Since the normal open type linear solenoid valve 100 is the same as the normally closed type solenoid valve 100 in terms of an operation and an effect except respective ports formed in the valve spool 120 and the valve body 110 are formed in opposite directions, a detailed description is omitted.

Figure 4:
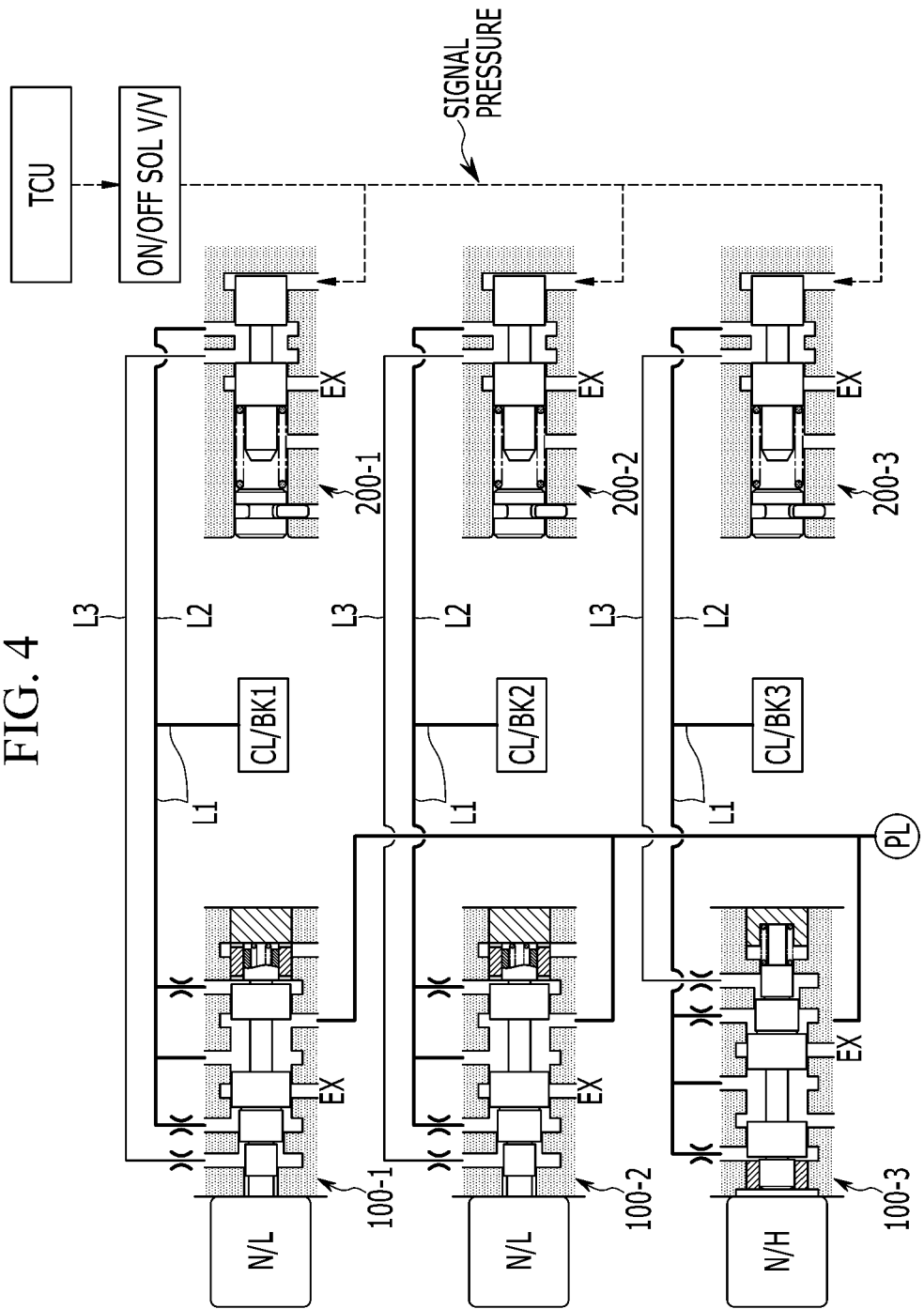
FIG. 4 is a configuration diagram of a hydraulic control system.

FIG. 4 is a configuration diagram of a hydraulic control system in some forms of the present disclosure.

Referring to FIG. 4, assuming that three coupling elements CL/BK1, CL/BK2, and CL/BK3 are operated in one shift stage, the hydraulic control system in some forms of the present disclosure, it is exemplified that linear solenoid valves 100-1; N/L, 100-2; N/L, and 100-3; N/H and shift valves 200-1, 200-2, and 200-3 are applied to three coupling elements CL/BK1, CL/BK2, and CL/BK3, respectively.

Accordingly, while the linear solenoid valve 100-1; N/L, 100-2; N/L, and 100-3; N/H and the shift valves 200-1, 200-2, and 200-3 are configured in the same manner as in the first form, the respective linear solenoid valves 100-1; N/L, 100-2; N/L, and 100-3; N/H are independently controlled in accordance with the supply and cut-off states of the shift valves 200-1, 200-2, and 2003 and the high and low hydraulic pressures may be supplied to the corresponding coupling elements CL/BK1, CL/BK2, and CL/BK3.

Figure 5:
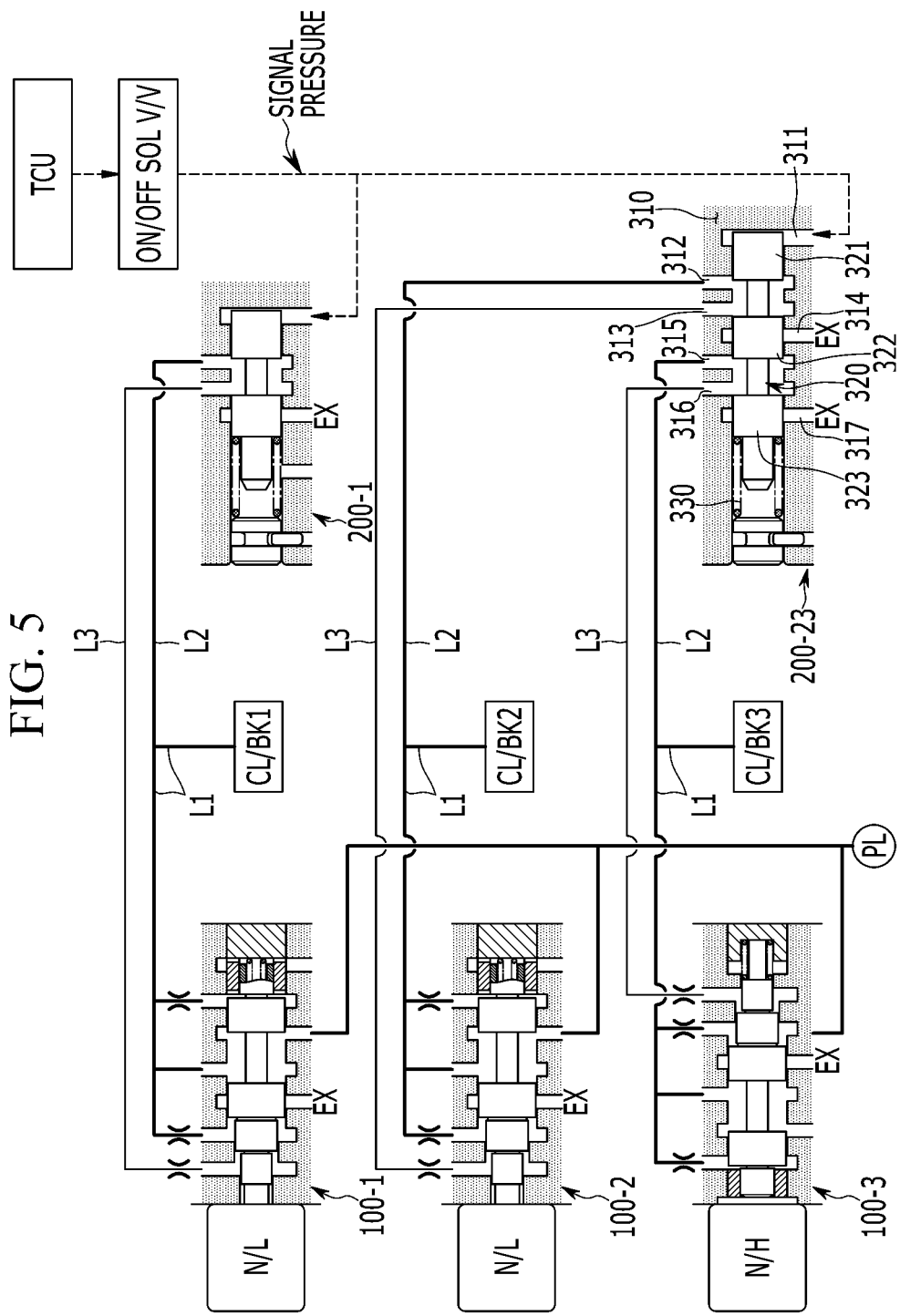
FIG. 5 is a configuration diagram of a hydraulic control system.

FIG. 5 is a configuration diagram of a hydraulic control system in some forms of the present disclosure.

Referring to FIG. 5, assuming that three coupling elements CL/BK1, CL/BK2, and CL/BK3 are operated in one shift stage, the hydraulic control system in some forms of the present disclosure is configured in such a manner that the first linear solenoid valve 100-1; N/L is controlled according to the supply and cut-off states of the first shift valve 100-1 and the second and third linear solenoid valves 100-2; N/L and 100-3; N/H applied to the second and third coupling elements CL/BK2 and CL/BK3 are controlled according to the supply and cut-off states of one common shift valve 200-23.

Accordingly, the first shift valve 100-1 is configured in the same manner as the shift valve 200 of the first form, but the common shift valve 200-23 is configured differently from the shift valve 200.

That is, the shift valve 200 includes a valve body 310, a valve spool 320 slidably embedded in the valve body 310, and an elastic member 330 elastically supporting the valve spool 320 to the right side of the figure.

The valve body 310 includes a first port 311 to which the signal pressure is supplied, a second port 312 connected to the second path L2 of the second linear solenoid valve 100-2, a third port 313 connected to the third path L3 of the second linear solenoid valve 100-2, and a fourth port 314 selectively discharging the hydraulic pressure supplied to the third port 313, a fifth port 315 connected to the second path L2 of the third linear solenoid valve 100-3, a sixth port 316 connected to the third path L3 of the third linear solenoid valve 100-3, and a seventh port 317 selectively discharging the hydraulic pressure supplied to the sixth port 316.

The valve spool 320 includes a first land 321 acting on the signal pressure supplied to the first port 311, a second land 322 selectively connecting the second port 312 and the third port 313 together with the first land 321, and a third land 323 selectively connecting the fifth port 315 and the sixth port 316 together with the second land 322, and the elastic member 330 providing the elastic force against the signal pressure of the first port 311 is disposed between the third land 323 and the valve body 320.

Accordingly, when the signal pressure is supplied through the first port 311, the valve spool 320 moves to the left side of the figure while overcoming the elastic force of the elastic member 330 to cut off the second port 312 and the fifth port 315 (cut-off state) and when the signal pressure is not supplied to the first port 311, the valve spool 320 moves to the right side in the figure due to the elastic force of the elastic member 330 and connects the second port 312 and the third port 313 and connects the fifth port 315 and the sixth port 316 (supply state) to supply the hydraulic pressure supplied to the second port 312 and the fifth port 315 to the seventh path L3 of each of the second and third linear solenoid valves 100-2 and 100-3.

When the common shift valve 200-23 is controlled to be in the cut-off state by such a configuration, the second and third linear solenoid valves 100-2 and 100-3 are controlled to control the hydraulic pressures supplied to the second and third coupling elements CL/BK2 and CL/BK3 to be relatively low (low pressure).

Further, contrary to this, when the common shift valve 200-23 is controlled to be in the supply state, the second and third linear solenoid valves 100-2 and 100-3 are controlled to control the hydraulic pressures supplied to the second and third coupling elements CL/BK2 and CL/BK3 to be relatively high (high pressure).

Figure 6:
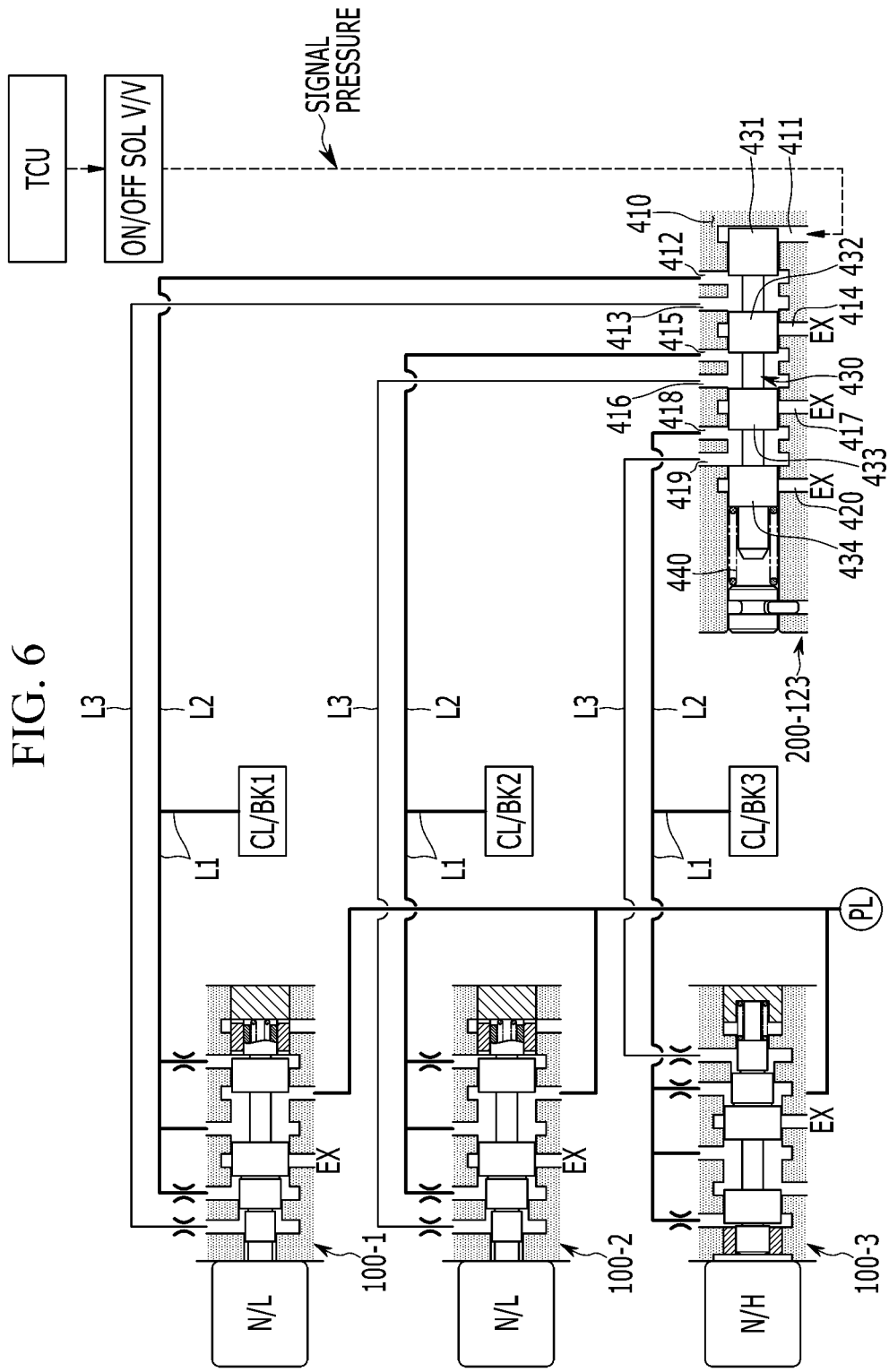
FIG. 6 is a configuration diagram of a hydraulic control system.

FIG. 6 is a configuration diagram of a hydraulic control system in some forms of the present disclosure.

Referring to FIG. 6, assuming that three coupling elements CL/BK1, CL/BK2, and CL/BK3 are operated in one shift stage, the hydraulic control system in some forms of the present disclosure is configured in such a manner that the linear solenoid valves 100-123; N/L, 100-2; N/L, and 100-3; N/H applied to three coupling elements CL/BK1, CL/BK2, and CL/BK3 are controlled according to the supply and cut-off states of one common shift valve 200-123.

Accordingly, the common shift valve 200-123 is configured differently from the shift valve 100 in some forms of the present disclosure.

That is, the common shift valve 200-123 includes a valve body 410, a valve spool 430 slidably embedded in the valve body 410, and an elastic member 440 elastically supporting the valve spool 430 to the right side of the figure.

The valve body 410 includes a first port 411 to which the signal pressure is supplied, a second port 412 connected to the second path L2 of the first linear solenoid valve 100-1, a third port 413 connected to the third path L3 of the first linear solenoid valve 100-2, a fourth port 414 selectively discharging the hydraulic pressure supplied to the third port 413, a fifth port 415 connected to the second path L2 of the second linear solenoid valve 100-2, a sixth port 416 connected to the third path L3 of the second linear solenoid valve 100-2, a seventh port 416 selectively discharging the hydraulic pressure supplied to the sixth port 417, an eighth port 418 connected to the second path L2 of the third linear solenoid valve 100-3, a ninth port 419 connected to the third path L3 of the third linear solenoid valve 100-3, and a tenth port 420 selectively discharging the hydraulic pressure supplied to the ninth port 419.

The valve spool 430 includes a first land 431 acting on the signal pressure supplied to the first port 411, a second land 431 selectively connecting the second port 412 and the third port 413 together with the first land 421, a third land 432 selectively connecting the fifth port 415 and the sixth port 416 together with the second land 432, and a fourth land 434 selectively connecting the eighth port 418 and the ninth port 419 together with the third land 433 and the elastic member 440 providing the elastic force against the signal pressure of the first port 411 is disposed between the fourth land 434 and the valve body 410.

Accordingly, when the signal pressure is supplied through the first port 411, the valve spool 430 moves to the left side of the figure while overcoming the elastic force of the elastic member 440 to cut off the second port 412, the fifth port 415, and the eighth port 418 (cut-off state) and when the signal pressure is not supplied through the first port 411, the valve spool 430 moves to the right side in the figure due to the elastic force of the elastic member 440 and connects the second port 412 and the third port 413 and connects the fifth port 415 and the sixth port 416 (supply state) to supply the hydraulic pressures supplied to the second port 412, the fifth port 415, and the eighth port 418 to the third path L3 of each of the first, second, and third linear solenoid valves 100-1, 100-2, and 100-3.

When the common shift valve 200-123 is controlled to be in the cut-off state by such a configuration, the first, second, and third linear solenoid valves 100-1, 100-2, and 100-3 are controlled to control the hydraulic pressures supplied to the first, second, and third coupling elements CL/BK1, CL/BK2, and CL/BK3 to be relatively low (low pressure).

Further, contrary to this, when the common shift valve 200-123 is controlled to be in the supply state, the first, second, and third linear solenoid valves 100-1, 100-2, and 100-3 are controlled to control the hydraulic pressures supplied to the first, second, and third coupling elements CL/BK1, CL/BK2, and CL/BK3 to be relatively high (high pressure).

As described above, in the hydraulic control system in some forms of the present disclosure, some of the hydraulic pressure controlled by the linear solenoid valve 100 and supplied to the coupling element, is branched into two paths and supplied to both ends of the linear solenoid valve 100, thereby increasing the stability of the hydraulic pressure.

Further, hydraulic control system in some forms of the present disclosure selectively supplies some of the hydraulic pressure controlled by the linear solenoid valve 100 and supplied to the coupling element through the shift valve 200 and controls the output hydraulic pressure of the linear solenoid valve by dual slopes of the high pressure and the low pressure to improve control sensitivity of the hydraulic pressure supplied to the coupling element.

In addition, the hydraulic control system in some forms of the present disclosure independently applies the shift valve 200 selectively supplying the feedback control pressure to the linear solenoid valve 100 independently applied to the plurality of coupling elements operated in one shift stage or applies one shift valve 200 to two or three linear solenoid valves 100 to simplify the configuration of a hydraulic circuit.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A hydraulic control system for an automatic transmission, the system comprising:
   a linear solenoid valve configured to control a line pressure and to supply the line pressure to a coupling element;
   a shift valve to which an output hydraulic pressure of the linear solenoid valve is supplied; and
   a transmission control unit configured to control the linear solenoid valve and the shift valve,
   wherein the linear solenoid valve is supplied with:
   a first feedback control pressure that is a portion of the output hydraulic pressure supplied to the coupling element from both sides of an input port and an output port; and
   a second feedback control pressure that when applied, expands an opening area of the input port,
   wherein the shift valve is configured to selectively supply the output hydraulic pressure of the linear solenoid valve as the second feedback control pressure according to a signal pressure,
   wherein the transmission control unit is configured to:
      control the second feedback control pressure as a supply state by cutting off the signal pressure of the shift valve when a required hydraulic pressure of the coupling element is high; and
      control the second feedback control pressure as a cut-off state by supplying the signal pressure of the shift valve when the required hydraulic pressure of the coupling element is low,
   wherein the linear solenoid valve comprises:
      a valve body;
      a valve spool slidably embedded in the valve body;
      an elastic member configured to elastically support one end of the valve spool; and
      a linear solenoid configured to provide a force against the elastic force of the elastic member,
   wherein the valve body further comprises:
      a first port as an input port;
      a second port as an output port;
      a third port and a fourth port formed on both sides of the second port;
      a fifth port formed adjacent to the third port; and
      a sixth port as a discharge port,
   wherein the line pressure is supplied to the first port,
   wherein the second port is connected with the coupling element through a first path,
   wherein the third port and the fourth port are connected with a first branch path and a second branch path that are branched from the first path, and
   wherein the fifth port is connected to selectively supply a hydraulic pressure of the first path as a feedback control pressure by controlling the shift valve connected through a second path and a third path.

2. The hydraulic control system of claim 1, wherein: orifices are disposed on the first branch path and the second branch path.

3. The hydraulic control system of claim 1, wherein the shift valve comprises:
   a valve body;
   a valve spool slidably disposed in the valve body; and
   an elastic member configured to provide elastic force against the signal pressure to one end of the valve spool,
   wherein the valve body further comprises:
      a sixth port to which the signal pressure is supplied;
      a seventh port configured to receive the output hydraulic pressure of the linear solenoid valve;
      an eighth port selectively connected with the seventh port; and
      a ninth port configured to selectively discharge the hydraulic pressure supplied to the eighth port.

4. The hydraulic control system of claim 3, wherein:
   the signal pressure is supplied to the sixth port,
   the seventh port is connected with a fifth path that is connected to a fourth path, and
   the eighth port is connected with the fifth port of the linear solenoid valve through a sixth path.

5. The hydraulic control system of claim 4, wherein: a third orifice is disposed on the third path.

6. The hydraulic control system of claim 1, wherein: each linear solenoid valve of three linear solenoid valves are independently controlled by a different shift valve of three shift valves such that three coupling elements are configured to operate in one shift stage, wherein the each linear solenoid valve of three linear solenoid valves is configured to control the hydraulic pressure supplied to each coupling element of three coupling elements.

7. The hydraulic control system of claim 1, wherein:
   one linear solenoid valve of three linear solenoid valves is independently controlled by one shift valve of three shift valves such that three coupling elements operate in one shift stage, wherein one linear solenoid valve of three linear solenoid valves is configured to control the hydraulic pressure supplied to one coupling element of three coupling elements, and
   two linear solenoid valves of three linear solenoid valves are controlled by one common shift valve, wherein two linear solenoid valves of three linear solenoid valves are configured to control the hydraulic pressure supplied to two coupling elements of three coupling elements.

8. The hydraulic control system of claim 1, wherein:
each linear solenoid valve of three linear solenoid valves is controlled by one common shift valve such that three coupling elements operate in one shift stage, wherein the each linear solenoid valve of three linear solenoid valves is configured to control the hydraulic pressure supplied to the each coupling element of three coupling elements.

\* \* \* \* \*